United States Patent [19]

Giallorenzi

[11] Patent Number: 4,593,968

[45] Date of Patent: Jun. 10, 1986

[54] POTTING TECHNIQUES FOR FIBER OPTICAL COUPLERS

[75] Inventor: Thomas G. Giallorenzi, Springfield, Va.

[73] Assignee: The United States of America as represented by the Secretary of the Navy, Washington, D.C.

[21] Appl. No.: 227,340

[22] Filed: Jan. 22, 1981

[51] Int. Cl.⁴ ............................ G02B 6/26; G02B 6/42
[52] U.S. Cl. ................................. 350/96.15; 350/96.20
[58] Field of Search ............................ 350/96.15, 96.20

[56] References Cited

U.S. PATENT DOCUMENTS 4,087,156  5/1978  Kao et al. ..................... 350/96.15 X
4,192,575  3/1980  Hodge ............................... 350/96.21

OTHER PUBLICATIONS

Giallorenzi, "Optical Communications Research & Technology: Fiber Optics", *Proceedings of the IEEE*, vol. 66, No. 7, pp. 744-780, (Jul. 1978).

Sheem et al., *Single-Mode Fiber-Optical Power Divider: Encapsulated Etching Technique*, Optics Letters, Jan. 1979, vol. 4, No. 1, pp. 29-31.

Primary Examiner—Paul Gensler
Attorney, Agent, or Firm—Robert F. Beers; Sol Sheinbein; Kenneth E. Walden

[57] ABSTRACT

A coupler for coupling light from one single mode optical fiber to another. Two or more optical fibers are provided in twisted or braided adjacency so that the evanescent field of one optical fiber is coupled into at least one other fiber for dividing the power therebetween. Means are provided for coextensively supporting and encapsulating the optical fibers to stabilize and protect them under demanding environmental conditions resulting from temperature variations, physical shock and vibration.

20 Claims, 10 Drawing Figures

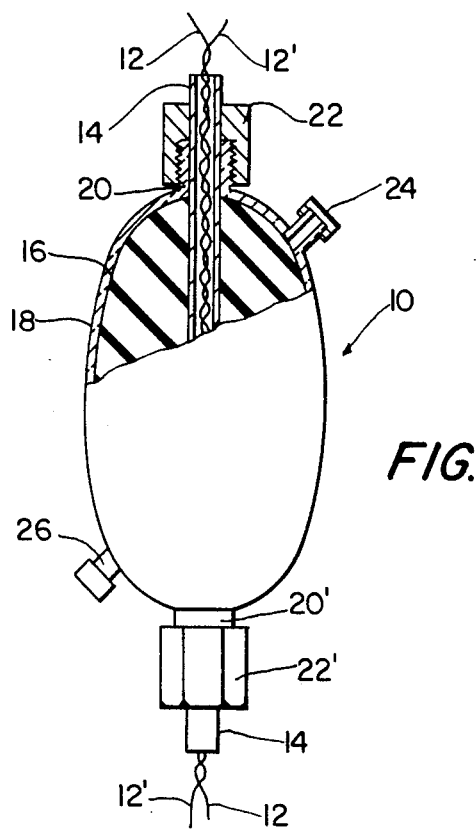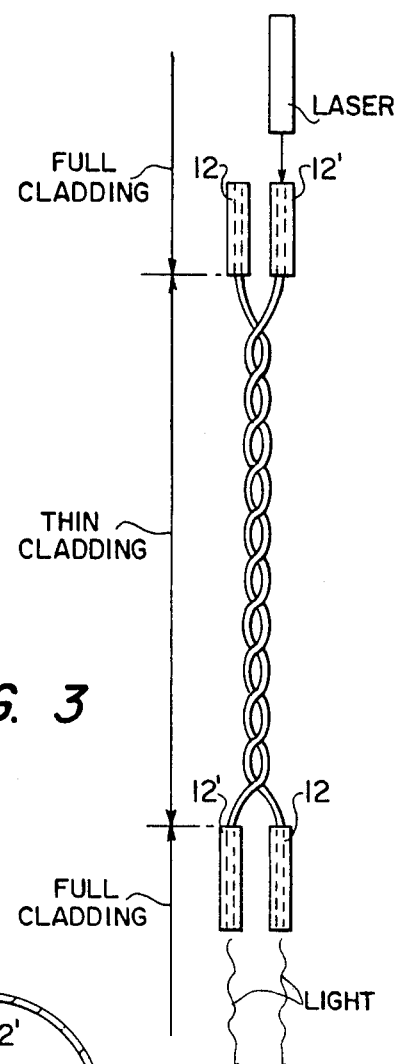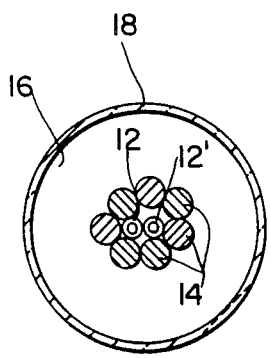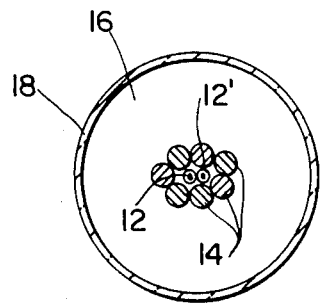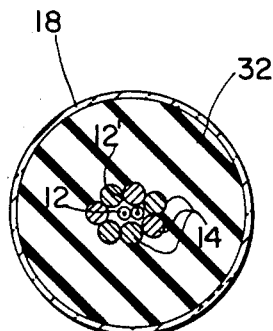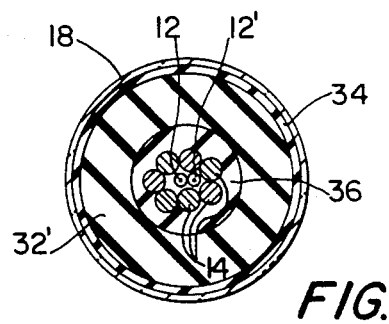

POTTING TECHNIQUES FOR FIBER OPTICAL COUPLERS

BACKGROUND OF THE INVENTION

This invention relates to an optical coupler for coupling coherent light from one single mode optical fiber to one or more adjacent optical fibers. More particularly, the invention is concerned with providing support for the optical fibers as they extend in close twisted or braided adjacency such as across a chamber of a housing where light is coupled from one fiber to another. To aid this light coupling, optical cladding of each of the optical fibers is etched thin to allow close adjacency of the optical cores.

There is disclosed in U.S. Pat. No. 4,264,126 by S. K. Sheem, entitled Optical Fiber-To-Fiber Envanescent Field Coupler, an arrangement for providing light coupling between optical fibers sealed in a bottle type housing. In that arrangement two cladded single mode optical fibers are twisted around each other over an extended distance with their optical claddings having been substantially etched away in the twisted region for allowing closeness of the optical cores. These fibers pass through an open chamber of a housing and out through sealed openings on opposite sides of the housing. A liquid such as oil, adapted to solidify upon curing, is introduced into the chamber where it defines an index matching material around the fibers. Means are provided for twisting the optical fibers to adjust their tension and maintain their adjacency for controlling light coupling therebetween. That coupler, termed a bottle coupler, because of its general appearance, is an optical power divider which serves as a beam splitter for use in optical arrangements where coherent light from a single source such as a laser is divided and caused to take separate optical fiber routes.

The single mode optical fibers used in bottle couplers are extremely small and fragile. Fiber breakage has been encountered due to environmental shock vibration, or differences in thermal expansion between the fibers and surrounding index materials. To circumvent this problem, several efforts have been undertaken to encapsulate the fibers in special epoxies and glues. In all cases, these efforts failed because expansion and contraction of the encapsulant was different from glass, thus causing breakage of the small optical fibers. The present invention is directed at providing sufficient mechanical support and protection for the small fragile optical fibers to protect them in their environment without interfering with light coupling therebetween.

SUMMARY OF THE INVENTION

According to the present invention, several embodiments are proposed for protecting, reinforcing and stabilizing the optical fibers to protect them from breakage. Furthermore, the arrangement disclosed provides for adjusting the tension on the optical fibers before and during the encapsulating process to ensure their twisted adjacency for proper coupling.

OBJECTS OF THE INVENTION

It is therefore an object of the invention to provide an improved and stabilized optical fiber-to-fiber coupler.

It is another object of this invention to provide an improved optical fiber-to-fiber coupler defining a power divider adaptable for use as a beam splitter.

It is still another object of this invention to provide reinforced encapsulation of optical fibers in twisted adacency to protect them from environmental shock and vibration, to prevent their breakage.

The above and yet other objects of the invention will become more apparent by reference to the following description in conjunction with the drawings.

BRIEF DESCRIPTION OF THE DRAWINGS

FIG. 1 is a partial cross-sectional view through the coupler illustrating both optical and support fibers in accordance with the present invention.

FIG. 2a is a transverse cross-sectional view of FIG. 1, with the optical and support fibers exaggerated in size for purposes of illustrating the invention at one stage of processing.

FIG. 2b is a transverse cross-sectional view similar to FIG. 2a illustrating the invention at the next stage of processing where the fibers have been reduced in diameter by action of an etchant.

FIG. 2c is a transverse cross-sectional view of a completed coupler showing a material encapsulating the fibers.

FIG. 2d is a cross-sectional view similar to FIG. 2c showing an alternate form of the completed coupler where the fibers are immediately surrounded by a soft encapsulant.

FIG. 3 illustrates (greatly enlarged) thinly cladded optical fibers in twisted adjacency for evanescent coupling of coherent laser light.

DESCRIPTION OF THE PREFERRED EMBODIMENTS

Figure 4:
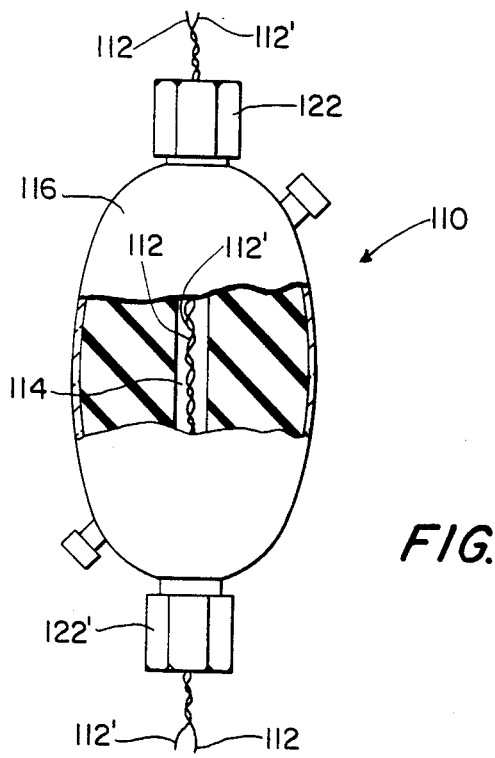
FIG. 4 is a partial cross-sectional view similar to FIG. 1, but illustrating an alternate fibers support arrangement.

Referring now to the drawings, there is illustrated in FIG. 1 a bottle coupler 10 in partial cross-section showing two optical fibers 12, 12' and plural relatively large support fibers 14 strung across chamber 16 formed within a thin-wall bulbous housing 18. Opposite end portions of the housing are provided with externally threaded necks 20 and 20' which have openings allowing communication to chamber 16. Caps 22 and 22', having openings in their tops, are threadedly received on necks 20 and 20', respectively.

Optical fibers 12 and 12', along with plural support fibers 14 which provide longitudinal and lateral reinforcement, are disposed through the cap and neck openings to span chamber 16. A sealant (not illustrated) is applied to each cap opening to surround the fibers and thereby establish a sealed chamber 16. The housing includes fill and drain tubes 24 and 26 through which etchants, cleaners and encapsulating materials are communicated to and from chamber 16. Removable covers are provided on each of these tubes. The fibers, now strung across chamber 16, are ready for processing through several steps for establishing evanescent coupling therebetween. However, before detailed description of these processes, evanescent field coupling of light from one fiber to another should be understood.

In a single mode optical fiber, the optical core is usually about 5 microns or less in diameter, and it is surrounded by cladding up to around 100 microns in diameter which has an index or refraction less than that of the core. A beam of light transmitted through an optical fiber is generally confined to the optical core, however, some of the light is carried in the cladding. The optical field in the core is known as the oscillatory field, while the optical field in the cladded region is known as the evanescent field. This evanescent field usually decays within a very short radial distance from the core-cladding interface. When two or more optical fibers have their claddings etched to just a few microns in thickness, and their cores are brought into close adjacency (within a few microns) for some distance (several centimeters), light is coupled from one core to the other. Such an arrangement is illustrated in FIG. 3 where thinly cladded portions of optical fibers 12 and 12' are twisted to lie in close (preferably touching) adjacency over a short distance. Twisting and axial tension on the fibers assures their adjacency, whereby light, such as from the laser, introduced into the end of one fiber is coupled into or shared with the other fiber through evanescent field coupling.

As illustrated in FIG. 2a, optical fibers 12 and 12' and solid plural support fibers 14 are disposed generally longitudinally across vacant chamber 16 of housing 18. For purposes of illustrating the invention, the fibers are shown greatly enlarged. The core diameters of single mode optical fibers 12 and 12' are around 5 microns and the outside diameters of their claddings are initially around 100 microns. Support fibers 14 are solid and have an initial outside diameter much greater, preferably around 300 to 800 microns. An etchant such as hydrofluoric acid is introduced through fill tube 24 into chamber 16, where it is permitted to remain for a predetermined time, to etch away a substantial portion of the outer surfaces of both sets of fibers. The etchant is then drained through tube 26, and the chamber thoroughly flushed with water or other solvent to completely remove all traces of the etchant. The fibers have now had their outside diameter reduced by this etching step—the optical fiber to an outside diameter of around 10 microns and the support fibers to around 300 microns. The fibers, as etched, are illustrated in FIG. 2b where they are shown in end view.

The material forming housing 18 is preferably a material with which the selected etchant does not react so that its walls thickness is not diminished. An index material such as an epoxy resin, glue or cement is now introduced in liquid form into chamber 16 and allowed to harden to define a hard encapsulant 32 surrounding the fibers. The fibers are twisted to adjust their tensioned adjacency by turning one or both caps 22 or 22', either before introduction of the liquid index material or immediately afterwards before it solidifies. FIG. 2c illustrates the optical fibers surrounded by plural support fibers, all of which are surrounded by hard encapsulant 32 to protect them from environmentally induced shock and vibration. Some of the encapsulant while in liquid form may seep between the support fibers to surround the optical fibers and fill the space therearound.

Support fibers 14 are selected to have a coefficient of expansion substantially close to that of the optical fibers and be of sufficient strength to protect the optical fibers from the strain of shrinkage or expansion of the hard encapsulant. The support fibers may be metal, glass or other materials sufficiently strong to protect the optical fibers. The index of refraction of the support fibers, if glass, and encapsulant is selected to be just below that of the optical core to prevent light leakage into the encapsulant and to aid light coupling between the fibers.

An alternate arrangement for encapsulating both the optical and support fibers is illustrated in FIG. 2d. A liquid material, such as RTV, is introduced into a flushed or cleaned chamber 16 through fill tube 24 to fill the chamber and surround the previously etched fibers. After a predetermined time, this liquid is drained from the chamber through drain tube 26. Some of the liquid, however, remains as a coating 34 on the inside of the chamber walls 18 and around the fibers. It is allowed to cure to a resilient rubberlike consistency, thereby establishing a soft encapsulant 36 immediately surrounding both the support fibers and the optical fibers. During processing some of the liquid material will likely seep between the support fibers and cure in contact with the optical fibers. Soft encapsulant 36 is also selected to have an index of refraction just below that of the optical fiber cores for aiding coupling of light between the fibers. The next step is to introduce a liquid material into the remaining space in chamber 16 and allow it to cure to define hard encapsulant 32'. This hard encapsulant as illustrated in FIG. 2d may have an index of refraction of any value because it does not directly effect coupling.

Once the optical and support fibers are encapsultated according to the FIGS. 2c or 2d embodiments, they are protected from environmental shock and vibrations. Support fibers 14, having a coefficient of expansion generally matching that of optical fibers 12 and 12', prevent thermal expansion or contraction of the encapsulants from straining the optical fibers. With the fibers so encapsulated, the coupler's performance is more stable and reliable. Additionally, by suitable choice of the encapsulants, the fibers may be protected from moisture and other contaminants which lead to fiber deterioration and optical failure. The addition of support fibers to strengthen and protect encapsulated fibers is necessary for the success of bottle couplers.

Alternate embodiments of the invention are illustrated in FIGS. 4 through 7. FIG. 4 shows in partial cross-sectional view a bottle coupler 110 having a housing 116 substantially identical to that disclosed in FIG. 1. It, however, employs a support fiber in the form of a ribbon fiber defining a substrate 114 for supporting twisted optical fibers 112 and 112' across the chamber of housing 116. The ribbon fiber may be formed of glass, and typically has a cross-sectional dimension of approximately 100 microns thick by 400–800 microns wide. It spans chamber housing 116 and may be anchored thereto at one or both ends such as by an epoxy resin. In the alternative the ribbon fiber may be anchored in a like manner to only one of screw caps 122 or 122'. Optical fibers 112 and 112' are strung across the chamber in contact with one flat surface of ribbon fiber 114. When the optical fibers are twisted and disposed in adjacency across the ribbon fiber surface as illustrated in FIG. 4, their optical cores are brought sufficiently close together to allow evanescent field optical coupling from one to the other.

Figure 5:
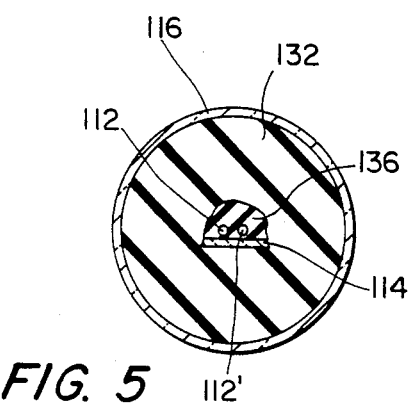
FIG. 5 is a transverse cross-sectional view of the coupler of FIG. 4 showing the optical fibers and support therefor greatly enlarged.

FIG. 5, which is a cross-sectional view taken transversely of housing 116, illustrates the optical fibers disposed adjacent a face of support ribbon fiber 114. For purposes of illustration, the optical fibers and ribbon fiber in FIG. 5 are shown greatly enlarged in relation to housing 116. In the actual coupler, as manufactured, the housing may be as much as 1-2 cm in diameter while the width of ribbon fiber 114 is only around 400-800 microns.

A glue or soft setting resin material is applied over a portion of the ribbon face to cover the optical fibers. This material is selected to set to a resilient consistency to define a soft encapsulant 136 surrounding the fibers. The encapsulant may be applied on only one side of the ribbon fiber, as illustrated in FIG. 5, or it may be applied to encircle the ribbon fiber completely. After encapsulant 136 is cured, another glue or epoxy material, selected to set to a hard consistency, is introduced into the remaining space in the housing chamber and allowed to solidify to define hard encapsulant 132 which completely surrounds soft encapsulant 136 and ribbon fiber 114.

Figure 6:
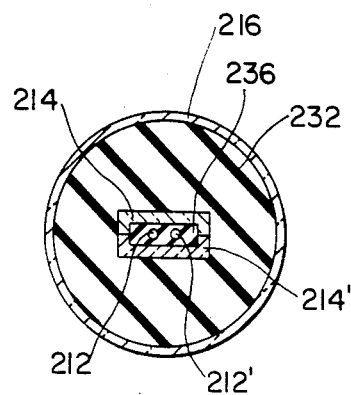
FIG. 6 is a transverse cross-sectional view of an alternate fiber support arrangement similar to FIG. 5.

An alternate arrangement for encapsulating the optical fibers is illustrated in FIG. 6. Optical fibers 212 and 212' are surrounded by a soft encapsulant 236 with spaced ribbon fibers 214 and 214', having either flat or longitudinally recessed facing surfaces, disposed on opposite sides thereof. A material selected to set to a hard consistency is then introduced into the chamber to form hard encapsulant 232 which completely surrounds ribbon fibers 214 and 214'.

Figure 7:
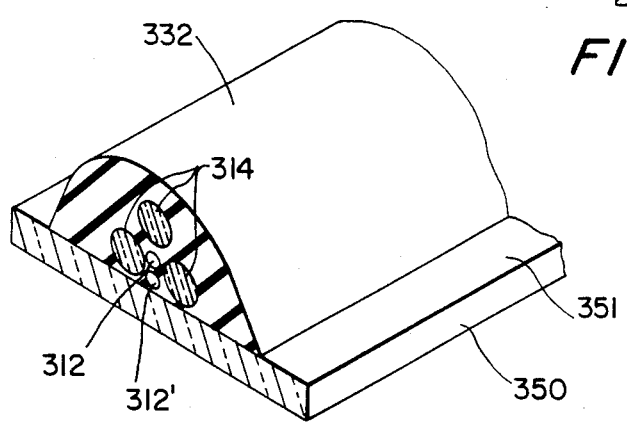
FIG. 7 is a perspective view in partial cross-section illustrating an alternate embodiment of an optical coupler.

The user of one or more ribbon fibers for lending support to the optical fibers is not limited to use in bottle couplers alone. FIG. 7 is a perspective cross-sectional view of an alternate fiber coupler. There is provided a ribbon fiber defining a glass substrate 350 having a surface 351 on which twisted optical fibers 312 and 312'. Surrounding coextensive support fibers 314 may also be incorporated in this design. An encapsulating material, either hard or soft, such as a glue or epoxy resin, is applied to the substrate to cover both optical and support fibers, and allowed to set for defining encapsulant 332. Some of the encapsulating material prior to setting will likely have seeped between the support fibers to fill the voids between the support fibers and the optical fibers as illustrated in FIG. 7. The term support fiber means is meant to encompass both the support fibers and one or more ribbon fibers, singly or together.

Because the encapsulating material, the ribbons fibers, and the support fibers actually contact the thin optical cladding around the fiber optical cores, it is preferable that they have refractive indices lower than that of the optical cores to prevent coupling out of light. Furthermore, the ribbon fiber and support fibers are selected to have coefficients of expansion substantially equal to that of the optical fibers, so that a change in environmental temperature causes essentially like expansion or contraction to protect the optical fibers from stress and breakage. Thermal expansions in the housing and hard encapsulant is generally absorbed by the ribbon fibers, support fibers and soft encapsulant.

There is disclosed several embodiments according to the invention. It will be obvious that changes and variations can be made thereto without departing from the spirit of the invention which is limited only by the scope of the claims annexed hereto.

What is claimed and desired to be secured by Letters Patent of the United States is:

1. A coupler for coupling light from one optical fiber to another comprising:
   at least two cladded single mode core optical fibers helically twisted together in close adjacency along coextensive portions with the claddings of the helically twisted together optical fibers having thicknesses approximately equal to the diameter of the single mode optical core whereby light carried in one fiber is evanescently coupled into at least one adjacent fiber;
   support fiber means having cross-sectional dimensions substantially greater than that of the optical fibers coextensively disposed along a length of the twisted optical fibers for defining longitudinal and lateral reinforcement therefor, and having a coefficient of thermal expansion substantially equal to that of the optical fibers to minimize stress therebetween; and
   an encapsulant surrounding the optical fibers and adhered to the support fiber reinforcement and having an index of refraction lower than that of the optical fiber cores to prevent coupling out of light from the cores.

2. A coupler for coupling light from one optical fiber to another comprising:
   at least two cladded single mode core optical fibers helically twisted together in close adjacency along coextensive portions with the claddings of the helically twisted together optical fibers having thicknesses approximately equal to the diameter of the single mode optical core whereby light carried in one fiber is evanescently coupled into at least one adjacent fiber;
   support fiber means having cross-sectional dimensions substantially greater than that of the optical fibers coextensively disposed along a length of the twisted optical fibers for defining longitudinal and lateral reinforcement therefor; and
   an encapsulant surrounding the optical fibers and adhered to the support fiber reinforcement and having an index of refraction lower than that of the optical fiber cores to prevent coupling out of light from the cores, and having a coefficient of thermal expansion substantially equal to that of the optical fibers to minimize stress therebetween due to environmental temperature changes.

3. A coupler for coupling light from one optical fiber to another comprising:
   at least two cladded single mode core optical fibers helically twisted together in close adjacency along coextensive portins with the claddings of the helically twisted together optical fibers having thicknesses approximately equal to the diamter of the single mode optical core whereby light carried in one fiber is evanescently coupled into at least one adjacent fiber;
   support fiber means having cross-sectional dimensions substantially greater than that of the optical fibers coextensively disposed along a length of the twisted optical fibers for defining longitudinal and lateral reinforcement therefor and having a coefficient of thermal expansion substantially equal to that of the optical fibers to minimize stress therebetween due to changing environmental temperatures;
   and encapsulant surrounding the optical fibers and adhered to the support fiber reinforcement and having an index of refraction lower than that of the optical fiber cores to prevent coupling out of light from the cores, and having a coefficient of thermal expansion substantially equal to that of the optical fibers to minimize stress therebetween due to changing environmental temperature.

4. A coupler for coupling light from one optical fiber to another comprising:
   at least two thinly clad single mode optical fibers helically twisted together in close adjacency along coextensive portions thereof whereby light carried in one of the fibers is coupled by its evanescent field into at least one adjacent fiber;
   support fiber means having cross-sectional dimensions substantially greater than that of the optical fibers and disposed coextensively along a length of the optical fibers for defining longitudinal and lateral reinforcement therefor;
   a resilient material adhered to the support fiber means and surrounding the helically twisted optical fibers defining a shock resisting soft encapsulant therefor;
   a hard material encapsulating the soft encapsulant;
   whereby the coupled optical fibers are protected from environmentally induced thermal stresses, shock and vibration.

5. The invention according to claim 4 wherein the support fiber means comprises plural support fibers arranged peripherally of the optical fibers.

6. The invention according to claim 4 wherein the support fiber means comprises ribbon fiber means to which the soft encapsulant material is adhered.

7. The invention according to claim 6 wherein the ribbon fiber means comprises a pair of ribbon fibers which sandwich the optical fibers and soft encapsulant therebetween.

8. The invention according to claim 6 or 7 wherein the soft encapsulant and ribbon fiber means are encapsulated by a hard encapsulant.

9. The invention according to claim 4 wherein the soft encapsulant has an index of refraction lower than that of the optical fiber cores to prevent coupling out light from the cores.

10. The invention according to claim 4, 5, 6 or 7 wherein the support fiber means are formed of materials having a thermal expansion coefficient substantially equal to that of the optical fibers whereby the optical fibers are protected from stresses induced by any thermal expansion of the hard encapsulant.

11. The invention according to claim 4 wherein the material forming the soft encapsulant has a coefficient of thermal expansion equal to that of the optical fibers.

12. An optical fiber-to-fiber coupler comprising:
   a housing having walls surrounding a chamber and including openings on opposite side thereof in communication with the chamber;
   at least two small diameter single mode optical fibers each including an optical core and surrounding cladding threaded through the wall openings with thinly cladded intermediate portions extending across the chamber in coextensive twisted adjacency whereby light carried by one fiber is coupled by its evanescent field into at least one of the other fibers;
   a plurality of relatively large support fiber means generally coextensive with and arranged about the optical fibers to define a support reinforcement therefor across the chambers;
   a first encapsulant immediately surrounding the optical fibers and adhered to the support reinforcement;
   a second encapsulant filling the chamber and surrounding the first encapsulant and support reinforcement;
   whereby the support reinforcement and first encapsulant protect the optical fibers from any thermal expansion, shock and vibration present in the second encapsulant.

13. The invention according to claim 12 wherein the first encapsulant comprises a resilient material and the second encapsulant comprises a hard material.

14. The invention according to claim 12 wherein the first encapsulant comprises a material having expansion properties similar to those of the optical fibers.

15. The invention according to claim 13 or 14 wherein the first encapsulant material has an index of refraction lower than that of the optical fiber core to prevent coupling of light therefrom.

16. The invention according to claim 12 wherein the relatively large support fibers means have a coefficient of thermal expansion substantially matching that of the optical fibers whereby any difference in thermal expansion between the encapsulants and the optical fibers is absorbed as strain in the support fiber means thereby protecting the optical fibers from breakage.

17. A coupler for coupling light from one optical fiber to another comprising:
   at least two cladded single mode core optical fibers helically twisted together in close adjacency along coextensive portions with claddings of the helically twisted together optical fibers having thicknesses approximately equal to the diameter of the single mode optical core whereby light carried in one fiber is evanescently coupled into at least one adjacent fiber;
   support fiber means having cross-sectinal dimensions substantially greater than that of the optical fibers coextensively disposed along a length of the twisted optical fibers for defining longitudinal and lateral reinforcement therefor, wherein said coextensive support fiber means comprises a plurality of support fibers arranged peripherally to the optical fibers and a ribbon fiber; and
   an encapsulant surrounding the optical fibers and adhered to the support fiber reinforcement and having an index of refraction lower than that of the optical fiber cores to prevent coupling out of light from the cores wherein said plurality of support fibers and said ribbon fiber define a substrate for said encapsulant.

18. The invention according to claim 17 wherein said support fiber means has a coefficient of thermal expansion substantially equal to that of the optical fibers to minimize stress therebetween.

19. The invention according to claim 17 wherein the coefficient of thermal expansion of the encapsulant material substantially equals that of the of the optical fibers to minimize stress therebetween due to environmental temperature changes.

20. The invention according to claim 17 wherein the support fiber means and the encapsulant are formed of material having coefficients of thermal expansion substantially equal to that of the optical fibers to minimize stress therebetween due to changing environmental temperature.

* * * * *